July 10, 1951     C. W. SMITH ET AL     2,560,195
COMPOSITION FOR MARKING RUBBER AND
METHOD OF USING COMPOSITION Filed Nov. 7, 1947                            2 Sheets-Sheet 2

INVENTORS
CORNELIUS W. SMITH
HAROLD GOLDEN
BY
Robert J. Patterson
ATTORNEY

Patented July 10, 1951

2,560,195

UNITED STATES PATENT OFFICE 2,560,195

COMPOSITION FOR MARKING RUBBER AND METHOD OF USING COMPOSITION

Cornelius W. Smith, Grosse Pointe Farms, and Harold Golden, Detroit, Mich., assignors to United States Rubber Company, New York, N. Y., a corporation of New Jersey Application November 7, 1947, Serial No. 784,770

8 Claims. (Cl. 154—139)

This invention relates to marking of rubber surfaces. The invention particularly relates to a new composition of matter in crayon form for marking rubber. The invention accomplishes the marking of unvulcanized rubber surfaces without decreasing the adhesion to another rubber surface to be vulcanized thereto.

Figure 1:
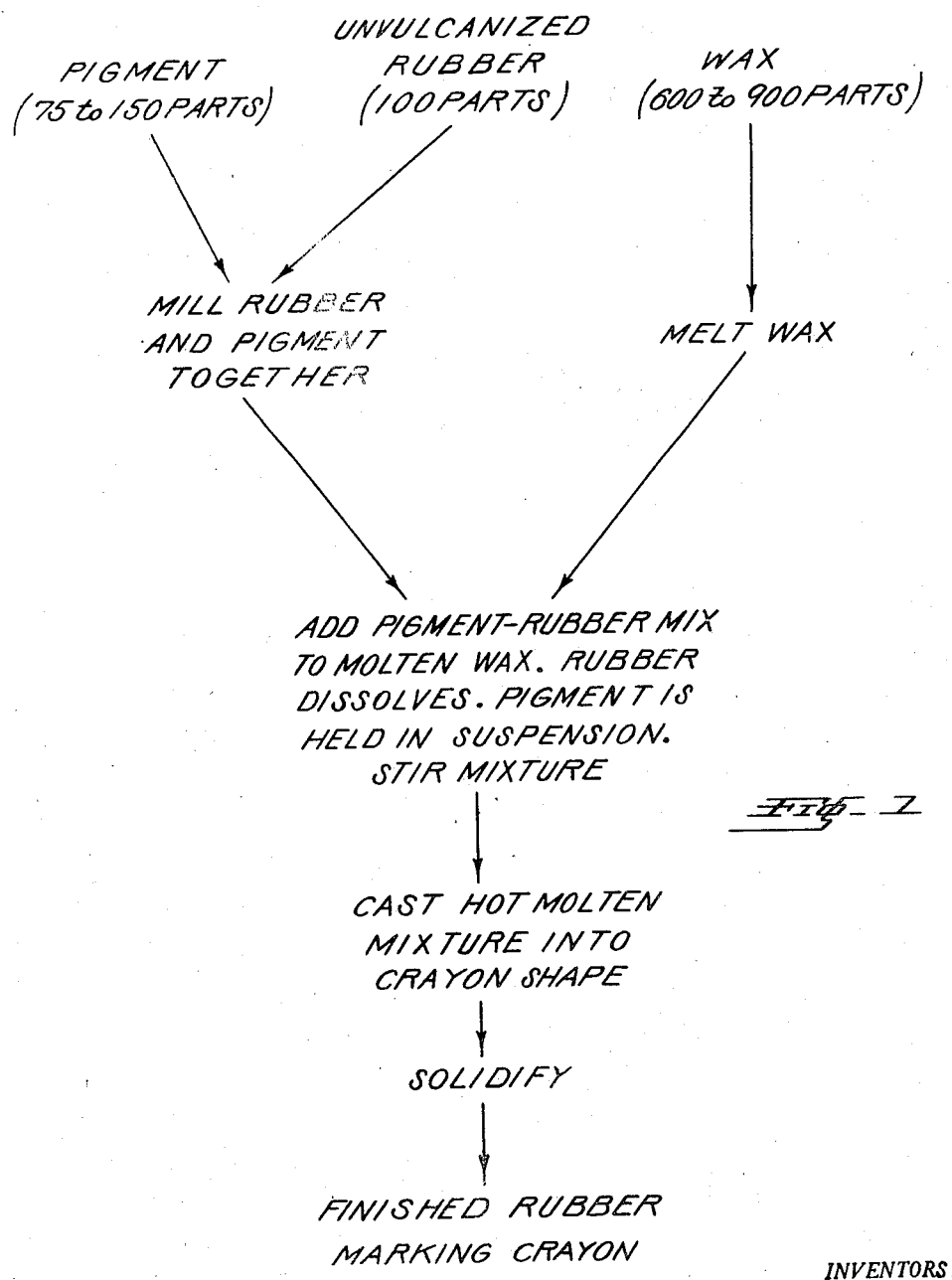

In the accompanying drawings,

Fig. 1 portrays diagrammatically the manufacture of a rubber marking crayon in accordance with our invention.

Figure 2:

Fig. 2 portrays the finished crayon.

Figure 3:
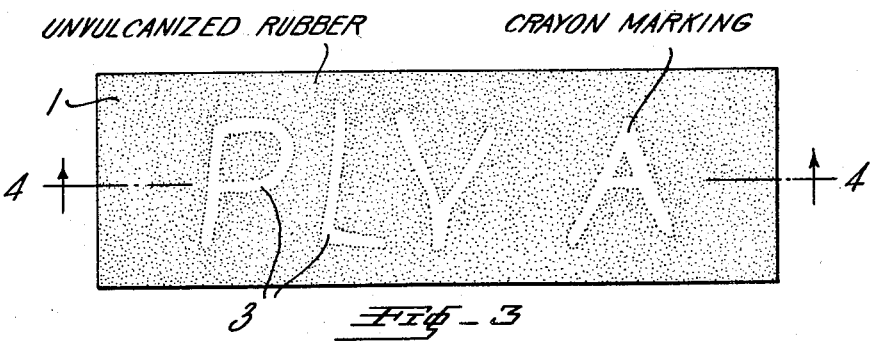
Figure 4:
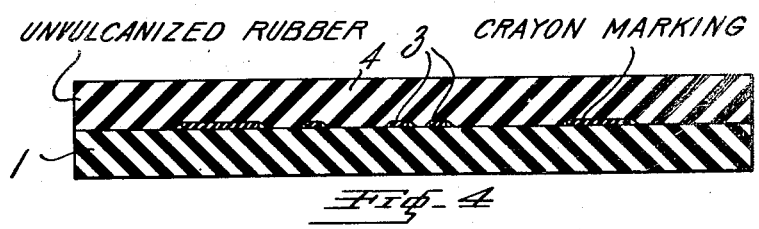
Figure 5:
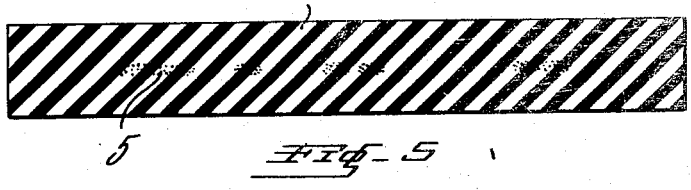

Figs. 3, 4, and 5 show the use of the crayon for marking a ply of unvulcanized rubber and bonding the marked ply to an unmarked ply of unvulcanized rubber, Fig. 3 being a plan view of a marked ply, Fig. 4 being a section of a plied-up assembly before vulcanization and Fig. 5 being a section of the vulcanized assembly.

It is often desirable to mark rubber surfaces. For example, in the manufacture of laminated rubber articles such as pneumatic tires, it is customary to mark all of the various plies of rubberized fabric, prior to plying them together and vulcanizing the assembly, with a crayon for identification purposes. Different colored crayons are employed for specific purposes.

Conventional crayons which are available consist of a wax with the proper color pigment in the wax. When these are used on unvulcanized rubber stock, the wax, being soluble in rubber, becomes diffused in the rubber, principally during cure, leaving the pigment remaining on the surface of the rubber. The pigment therefore is merely a dust which may be brushed off making identification difficult. When the pigment is interposed between two layers of rubber which are subsequently vulcanized the pigment acts a a lubricant or non-adherent foreign material which prevents adequate bonding of the rubber layers together.

We have found that rubber surfaces may be marked in a highly advantageous manner with a crayon formed from a mixture composed essentially of rubber, wax and pigment. The relative proportions of wax and rubber may vary from 600 to 900 parts of wax and from 75 to 150 parts of pigment per 100 parts of rubber.

We have found when rubber or rubberized stocks are marked with a crayon according to the present invention, that the marking is not only more permanent and readily visible but also does not interfere to an objectionable extent with the bonding of the marked rubber surface to another rubber surface to be vulcanized thereto. Thus even though the wax of the marking crayon of our invention dissolves in the rubber by diffusion at elevated temperatures such as those prevailing during curing it leaves the pigment on the surface intermixed with a rubber base as a binder. This binder prevents removal of the pigment from the surface by rubbing or abrasion because a rubber coating is formed around the pigment particles as in the case of a cement when the solvent evaporates. Ordinarily, a coating of a powder such as talc or the like will prevent adhesion between two rubber surfaces but that is not the case with the marking of our invention because of the effect just noted. As a result the bond obtained upon vulcanization of an assembly of two rubber surfaces with the marking of the present invention on one of the surfaces is in all cases very much stronger than it would be were the marking done with the conventional wax-pigment crayon.

The wax component may consist of a single wax or of a mixture of waxes. We may use any wax which when in the molten condition is a solvent for rubber, which is soluble in rubber and which yields a mixture having the necessary hardness and consistency to retain the shape of a crayon under conditions of marking. Examples of suitable waxes are: carnauba wax, paraffin wax, beeswax, mineral wax, ozocerite, montan wax, Japan wax, Chinese insect wax, candelilla wax, etc. We may also use artificial waxes such as those prepared by heating mixtures of higher acids and alcohols under esterifying conditions. We may also use higher fatty acids having the physical properties of waxes, especially stearic acid. We often prefer to use a blend of a major proportion of carnauba wax and a minor proportion of paraffin wax. In many cases we prefer to employ a minor proportion of stearic acid in the wax. For example we secure very good results by the use of a wax mixture composed of a major proportion of carnauba wax and minor proportions of paraffin wax and stearic acid. In addition to serving as a wax, stearic acid acts as a modifying agent in controlling the hardness characteristics of the crayon. Where several waxes are used, their proportions should be so adjusted as to give the desired hardness in the crayon.

We may use any pigment capable of imparting the desired color to the marking and sufficiently opaque that the mark is easily visible. Titanium dioxide is especially suitable but we may use other white pigments such as zinc oxide, barium sulfate, lithopone, etc. Where a colored marking is desired, we may use pigments having the desired color such as yellow, blue, green, red, orange, brown, black, etc. We often prefer to use titanium dioxide in conjunction with zinc oxide since zinc oxide is very beneficial in rubber stocks although it is not as white as titanium dioxide.

The proportions of rubber, wax and pigment may be varied within the limits stated above. The higher proportions of pigment are used where a particular vivid marking, such as one of white, is desired.

In preparing the material, the compounding may conveniently be accomplished by mixing the rubber and pigments on a mill and subsequently placing this compound mix into the hot molten wax whereupon the rubber dissolves and the pigments are held in suspension. The hot wax containing the dissolved rubber and suspended pigments is stirred and poured into molds to form the crayons. If desired, the mix may be allowed to solidify in bulk and at any subsequent time it may be heated and poured into molds. Fig. 1 of the drawings, which is self-explanatory, portrays the preferred way of making the crayons of our invention. Fig. 2 shows the finished crayon.

It is often desirable to incorporate a portion of the wax component, such as the stearic acid, with the rubber pigment mix for the purpose of softening the compound during the milling operation.

If desired, any of the conventional curing agents, such as sulfur, and accelerators may be added to the mix. For example, one part of mercaptobenzothiazole and three parts of sulfur per 100 parts of rubber may be used. In most cases, however, use of curing agents and of accelerators is unnecessary since there will be sufficient migratory accelerators and curing agents from the adjoining stocks to cure the rubber in the crayon deposited in marking. The present invention applies primarily to the marking of unvulcanized rubber, since that is the most extensively practiced, but it may advantageously be employed to mark vulcanized rubber surfaces because it leaves a more permanent mark even after the wax or waxes have dissolved in the rubber. The invention applies to either natural or synthetic rubber.

In using the crayon of our invention, a ply of unvulcanized rubber 1 is marked with the crayon 2 to give the marking 3. This marked ply is then placed adjacent a second ply 4 of unvulcanized rubber as shown in Fig. 4. It will be understood that the marking 3 is greatly exaggerated in thickness for purpose of illustration. The plied-up assembly is then vulcanized to give the integral assembly shown in Fig. 5. In Fig. 5, the particles 5 of pigment from the marking 3 are shown although it would be practically impossible to locate them in an actual vulcanized assembly because the amount of pigment deposited in a marking operation is extremely small. Since the residual pigment particles are completely surrounded by rubber, they do not weaken the bond obtained upon vulcanization.

Following are typical examples of crayon formulations in accordance with our invention. In each example, by "rubber" is meant natural rubber such as smoked sheets, although GR-S (butadiene-styrene rubbery copolymer) or other suitable synthetic rubber may be employed in place thereof. All parts are by weight.

*Example 1*

| | |
|---|---|
| Rubber | 100 |
| Zinc oxide | 10 |
| Titanium dioxide | 100 |
| Stearic acid | 150 |
| Paraffin wax | 150 |
| Carnauba wax | 500 |

*Example 2*

| | |
|---|---|
| Rubber | 100 |
| Titanium dioxide | 100 |
| Paraffin wax | 300 |
| Carnauba wax | 500 |

*Example 3*

| | |
|---|---|
| Rubber | 100 |
| Zinc oxide | 50 |
| Titanium dioxide | 50 |
| Paraffin wax | 800 |

*Example 4*

| | |
|---|---|
| Rubber | 100 |
| Zinc oxide | 10 |
| Titanium dioxide | 100 |
| Green pigment | 25 |
| Stearic acid | 100 |
| Paraffin wax | 100 |
| Carnauba wax | 500 |

The rubber and pigment were mixed together to a uniform mixture by milling on a rubber mill. The resulting mixture was then placed with stirring in the molten wax which was at a temperature slightly above its melting point whereupon the rubber dissolved and the pigment went into suspension. The hot mixture was stirred, poured into molds, and allowed to cool. The resulting crayons displayed excellent rubber marking characteristics. Examples 1 to 3 gave white crayons while Example 4 produced a green crayon.

From the foregoing description, many advantages of our invention will be readily apparent to those skilled in the art. Among these advantages are the cheapness and simplicity of manufacture of our rubber marking crayons, the distinctness and permanence of the markings produced therewith and the good adhesion between rubber surfaces vulcanized together with the marking therebetween in contrast to the greatly reduced adhesion caused by markings with conventional wax crayons.

Having thus described our invention, what we claim and desire to protect by Letters Pattent is:

1. The method which comprises marking an unvulcanized rubber surface by rubbing said surface with a crayon composed of a stick of an unvulcanized normally solid marking composition consisting essentially of unvulcanized rubber, rubber-soluble wax and pigment, in proportions by weight of from 6 to 9 parts of said wax and from 0.75 to 1.5 parts of said pigment per part of rubber, said rubber being dissolved in said wax and said pigement being suspended in the resulting solution, placing another unvulcanized surface in contact with the marked surface and subsequently vulcanizing said rubber surfaces together, the bond produced therebetween by the vulcanization being much stronger than it would be if the marking were deposited from a conventional wax-pigment rubber marking crayon.

2. The method which comprises marking an unvulcanized rubber surface by rubbing said surface with a crayon composed of a stick of an unvulcanized normally solid marking composition consisting essentially of unvulcanized rubber, a wax mixture comprising a major proportion of carnauba wax and a minor proportion of paraffin wax, and pigment, in proportions by weight of from 6 to 9 parts of said wax and from 0.75 to 1.5 parts of said pigment per part of rubber, said rubber being dissolved in said wax and said pigment being suspended in the resulting solution, placing another unvulcanized surface in contact with the marked surface and subsequently vulcanizing said rubber surfaces together, the bond produced therebetween by the vulcanization being much stronger than it would be if the marking were deposited from a conventional wax-pigment rubber marking crayon.

3. The method which comprises marking an unvulcanized rubber surface by rubbing said surface with a crayon composed of a stick of an unvulcanized normally solid marking composition consisting essentially of unvulcanized rubber, a wax mixture composed of a major proportion of carnauba wax and minor proportions of paraffin wax and stearic acid, and pigment, in proportions by weight of from 6 to 9 parts of said wax and from 0.75 to 1.5 parts of said pigment per part of rubber, said rubber being dissolved in said wax and said pigment being suspended in the resulting solution, placing another unvulcanized surface in contact with the marked surface and subsequently vulcanizing said rubber surfaces together, the bond produced therebetween by the vulcanization being much stronger than it would be if the marking were deposited from a conventional wax-pigment rubber marking crayon.

4. A method as set forth in claim 1 wherein said composition forming said stick was prepared by milling said pigment and said unvulcanized rubber together and subsequently admixing the resulting pigment-rubber mixture with the hot molten wax.

5. As a new article of manufacture, a crayon for marking rubber, said crayon being composed of a stick of an unvulcanized normally solid composition consisting essentially of unvulcanized rubber selected from the group consisting of natural rubber and butadiene-styrene rubbery copolymer, rubber-soluble wax and pigment, in proportions by weight of from 6 to 9 parts of said wax and from 0.75 to 1.5 parts of said pigment per part of said rubber, said rubber being dissolved in said wax and said pigment being suspended in the resulting solution, said composition having such hardness and consistency that the crayon retains its shape under conditions of marking, whereby in the resulting deposited marking even though the wax diffuses into the rubber of the marked surface the pigment is left on the surface intermixed with the rubber of the marking so that removal of the marking from the marked rubber surface by rubbing or abrasion is prevented, and upon vulcanization of an assembly of another rubber surface with a rubber surface marked with said crayon, the bond obtained is much stronger than it would be if the marking were deposited from a conventional wax-pigment crayon.

6. As a new article of manufacture, a crayon for marking rubber, said crayon being composed of a stick of an unvulcanized normally solid composition consisting essentially of unvulcanized rubber selected from the group consisting of natural rubber and butadiene-styrene rubbery copolymer, a wax mixture comprising a major proportion of carnauba wax and a minor proportion of paraffin wax, and pigment, in proportions by weight of from 6 to 9 parts of said wax and from 0.75 to 1.5 parts of said pigment per part of said rubber, said rubber being dissolved in said wax and said pigment being suspended in the resulting solution, said composition having such hardness and consistency that the crayon retains its shape under conditions of marking, whereby in the resulting deposited marking even though the wax diffuses into the rubber of the marked surface the pigment is left on the surface intermixed with the rubber of the marking so that removal of the marking from the marked rubber surface by rubbing or abrasion is prevented, and upon vulcanization of an assembly of another rubber surface with a rubber surface marked with said crayon, the bond obtained is much stronger than it would be if the marking were deposited from a conventional wax-pigment crayon.

7. As a new article of manufacture, a crayon for marking rubber, said crayon being composed of a stick of an unvulcanized normally solid composition consisting essentially of unvulcanized rubber selected from the group consisting of natural rubber and butadiene-styrene rubbery copolymer, a wax mixture composed of a major portion of carnauba wax and minor proportions of paraffin wax and stearic acid, and pigment, in proportions by weight of from 6 to 9 parts of said wax and from 0.75 to 1.5 parts of said pigment per part of said rubber, said rubber being dissolved in said wax and said pigment being suspended in the resulting solution, said composition having such hardness and consistency that the crayon retains its shape under conditions of marking, whereby in the resulting deposited marking even though the wax diffuses into the rubber of the marked surface the pigment is left on the surface intermixed with the rubber of the marking so that removal of the marking from the marked rubber surface by rubbing or abrasion is prevented, and upon vulcanization of an assembly of another rubber surface with a rubber surface marked with said crayon, the bond obtained is much stronger than it would be if the marking were deposited from a conventional wax-pigment crayon.

8. A crayon for marking rubber, said crayon being composed of a stick of an unvulcanized normally solid composition consisting essentially of unvulcanized rubber selected from the group consisting of natural rubber and butadiene-styrene rubbery copolymer, rubber-soluble wax and pigment, in proportions by weight of from 6 to 9 parts of said wax and from 0.75 to 1.5 parts of said pigment per part of said rubber, said rubber being dissolved in said wax and said pigment being suspended in the resulting solution, said composition having been prepared by milling said pigment and said unvulcanized rubber together and subsequently admixing the resulting pigment-rubber mixture with the molten wax, said composition having such hardness and consistency that the crayon retains its shape under conditions of marking, whereby in the resulting deposited marking even though the wax diffuses into the rubber of the marked surface the pigment is left on the surface intermixed with the rubber of the marking so that removal of the marking from the marked rubber surface by rubbing or abrasion is prevented, and upon vulcanization of an assembly of another rubber surface with a rubber surface marked with the said crayon, the bond obtained is much stronger than it would be if the marking were deposited from a conventional wax-pigment crayon.

CORNELIUS W. SMITH.
HAROLD GOLDEN.

REFERENCES CITED

The following references are of record in the file of this patent:

UNITED STATES PATENTS

| Number | Name | Date |
|---|---|---|
| 1,552,907 | Binmore | Sept. 8, 1925 |
| 1,800,561 | Neidich | Apr. 14, 1931 |
| 2,051,944 | Hershberger | Aug. 25, 1936 |
| 2,054,115 | Abrams et al. | Sept. 15, 1936 |
| 2,331,742 | Snyder | Oct. 12, 1943 |
| 2,380,126 | Sturm | July 10, 1945 |

FOREIGN PATENTS

| Number | Country | Date |
|---|---|---|
| 112,688 | Australia | Mar. 20, 1941 |